United States Patent
Kriesel et al.

(10) Patent No.: US 11,155,671 B1
(45) Date of Patent: *Oct. 26, 2021

(54) TRANSPORT STABILIZATION OF PORTABLE ITEMS

(71) Applicant: Tak Logic, LLC, Ettrick, WI (US)

(72) Inventors: Matthew Wayne Kriesel, Melrose, WI (US); Troy Bradley Goodenough, Mindoro, WI (US)

(73) Assignee: Tak Logic, LLC, Ettrick, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,665

(22) Filed: May 1, 2020

Related U.S. Application Data

(63) Continuation-in-part of application No. 15/731,815, filed on Aug. 7, 2017, which is a continuation-in-part of application No. 14/999,722, filed on Jun. 20, 2016, now Pat. No. 10,807,767.

(60) Provisional application No. 62/231,004, filed on Jun. 22, 2015.

(51) Int. Cl.
| | |
|---|---|
| *C08G 18/48* | (2006.01) |
| *C08G 18/10* | (2006.01) |
| *C08G 18/76* | (2006.01) |
| *C08G 18/22* | (2006.01) |
| *C08K 5/00* | (2006.01) |

(52) U.S. Cl.
CPC ......... *C08G 18/4812* (2013.01); *C08G 18/10* (2013.01); *C08G 18/227* (2013.01); *C08G 18/4825* (2013.01); *C08G 18/4829* (2013.01); *C08G 18/7671* (2013.01); *C08K 5/0016* (2013.01); *C08G 2650/36* (2013.01)

(58) Field of Classification Search
CPC ........................ C08G 18/4812; C08G 18/4825; C08G 18/10; C08G 18/4829; C08G 18/7671; C08G 18/227; C08G 2650/36; C08K 5/0016

See application file for complete search history.

(56) References Cited

U.S. PATENT DOCUMENTS

| | | |
|---|---|---|
| 3,507,071 A | 4/1970 | Bryson |
| 5,677,413 A | 10/1997 | Barksby et al. |
| 5,864,001 A | 1/1999 | Masse et al. |
| 6,588,511 B1 | 7/2003 | Kriesel et al. |
| 6,673,409 B1 | 1/2004 | Wheatley |
| 6,896,065 B2 | 5/2005 | Kriesel et al. |
| 7,041,719 B2 * | 5/2006 | Kriesel ............... A01L 7/02 524/114 |
| 7,125,602 B2 | 10/2006 | Wheatley |
| 7,252,867 B2 | 8/2007 | Wheatley |
| 7,910,188 B2 | 3/2011 | Wheatley |
| 7,923,088 B2 | 4/2011 | Wheatley |
| 8,110,269 B2 | 2/2012 | Wheatley |
| 8,110,270 B2 | 2/2012 | Wheatley |
| 8,302,213 B2 | 11/2012 | Kriesel |
| 9,974,342 B1 * | 5/2018 | Kriesel ............. A41D 13/0512 |
| D880,950 S | 4/2020 | Kriesel et al. |
| 10,681,830 B1 | 6/2020 | Goodenough |
| 10,717,582 B1 | 7/2020 | Goodenough |
| 10,807,767 B1 * | 10/2020 | Kriesel ............. C08G 59/1472 |
| D902,584 S | 11/2020 | Kriesel et al. |
| 10,914,087 B1 | 2/2021 | Kriesel et al. |
| 2004/0191446 A1 | 9/2004 | Kriesel |
| 2004/0200623 A1 | 10/2004 | Kriesel |
| 2006/0272367 A1 | 12/2006 | Kriesel |
| 2006/0287147 A1 | 12/2006 | Kriesel |
| 2008/0005929 A1 | 1/2008 | Hardy et al. |
| 2008/0026658 A1 | 1/2008 | Kriesel |
| 2008/0250729 A1 | 10/2008 | Kriesel |
| 2009/0042676 A1 | 2/2009 | Kriesel |
| 2010/0170139 A1 | 7/2010 | Zhou |
| 2012/0222457 A1 | 9/2012 | Kriesel et al. |
| 2013/0288600 A1 | 10/2013 | Pind et al. |
| 2015/0053583 A1 | 2/2015 | McCormick et al. |

* cited by examiner

*Primary Examiner* — Rabon A Sergent
(74) *Attorney, Agent, or Firm* — Bryan R. Rosiejka; M. Paul Hendrickson

(57) ABSTRACT

A unique transport stabilizing combination for stabilizing items during conditions of movement comprises a viscoelastomeric thermoset overlay disposed upon a vehicular support member. The viscoelastomeric thermoset overlay component of the transport stabilizing combination is desirably viscoelastomeric, adhesive, cohesive, releasable, antipathogenic, cleansable and/or reusable. The vehicular support member is desirably an extension of a vehicle, and the transport stabilizing combination can stabilize a portable item against movement and damage during conditions of movement, such as rocking or during transport.

34 Claims, 5 Drawing Sheets

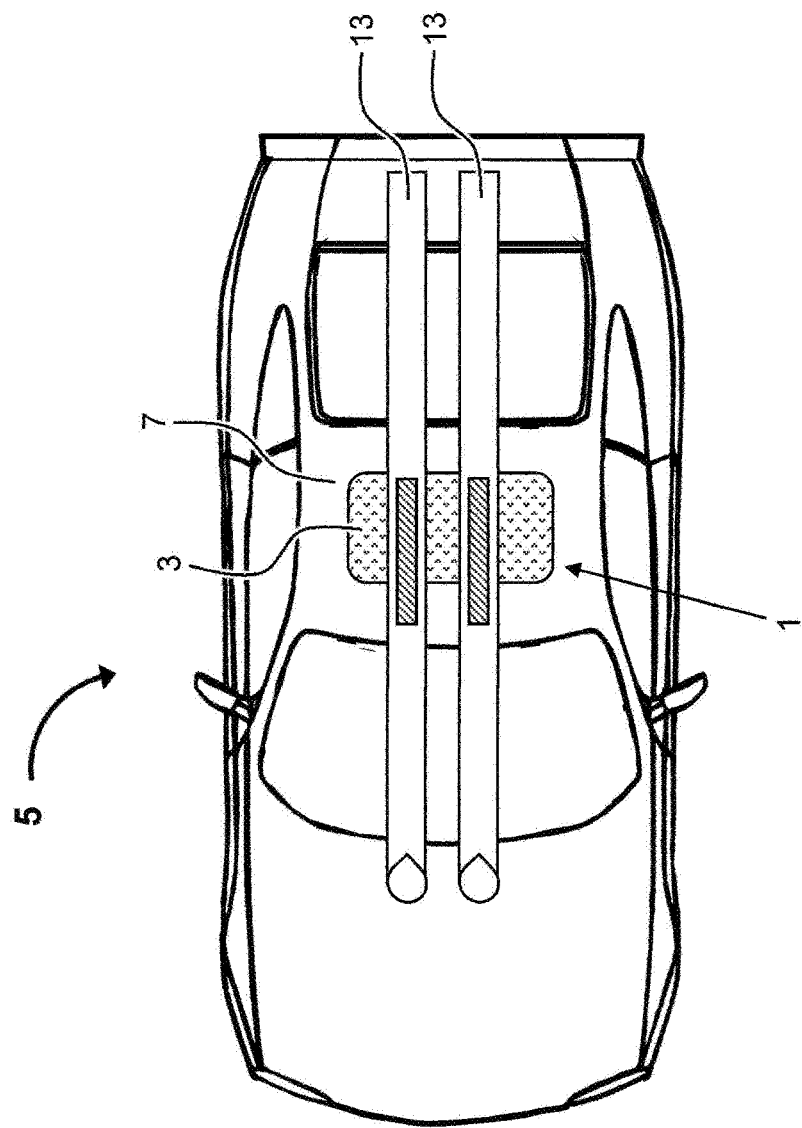

TRANSPORT STABILIZATION OF PORTABLE ITEMS

CROSS-REFERENCE TO RELATED APPLICATION

This application is a Continuation-In-Part of, and claims priority to, U.S. Nonprovisional application Ser. No. 15/731,815 filed Aug. 7, 2017, which is a Continuation-In-Part of U.S. Nonprovisional application Ser. No. 14/999,722 filed Jun. 20, 2016, which is a Nonprovisional application of U.S. Provisional Application No. 62/231,004 filed Jun. 22, 2015, all of which applications are incorporated herein by reference in their entirety.

FIELD OF INVENTION

The present invention relates to the stabilization of items, and more particularly to a stabilizing cohesive and adhesive viscoelastomer system for use to protectively immobilize transportable items, such as during transport or other conditions of movement.

BACKGROUND OF THE INVENTION

An acute long-standing need exists for an effective means to stabilize items, such as portable items, against excessive movement and potential damage during conditions of movement, particularly within the field of mobile vehicular travel. Essentially, mobile vehicles, such as wheel chairs, wheeled walking supports, recreational vehicles, trailers, emergency vehicles, all-terrain vehicles, aircraft, watercraft, cars, trucks, buses, snowmobiles, etc., would greatly benefit from a system which could stabilize individual items against movement and damage, such as while in transit.

Throughout time, people have been confronted with the perplexing problem of effectively stabilizing goods during conditions of movement. Common practices include the use of insulated packaging materials to maintain goods in a tightly packed position during conditions of movement. Other methods include strapping, bolting, wedging, tying, or otherwise securing goods at a set position to prevent repositioning or spilling of the goods during conditions of movement. Other means for safeguarding goods to prevent repositioning during conditions of movement involve providing cavities or recesses which mate to the goods, as well as cushioning materials (e.g., foams, bubble packs, etc.). Magnets have also been sparingly used to stabilize goods against movement. Unfortunately, such stabilizing means exhibit limited success due to numerous variables, such as cost, a need to tailor-make retainers for a specific good, ineffectiveness of such retainers, tedious time and effort required to secure and unsecure goods (as well as to quickly re-secure the goods), an inability to reuse the retainers, an inability to quickly access the goods such as for use during transit, etc., all of which are indicative of a need for a better system to effectively immobilize and protect goods during conditions of movement.

Additional attempts have also been made to utilize certain frictional pads placed upon substantially flat vehicular surfaces (e.g., an automotive dashboard or console) to frictionally stabilize small and flat items (e.g., smartphones) against movement (see e.g., U.S. Pat. Nos. 7,923,088, 7,910,188, 7,252,867, 7,125,602 and 6,673,409 to A. J Wheatley). Although such frictional pads may be useful for limited applications (e.g., small, flat-surfaced items placed upon a corresponding frictional flat surface which essentially only prevents the items from sliding), their overall effectiveness is seriously impaired with respect to vertical and/or angular movement, as well as with respect to irregular shaped or larger sized items which generally fail to provide a sufficient flat surface area for frictional engagement.

A host of new industrial, commercial and personal use advantages would arise if it were possible to stabilize a wide range of divergent sized and shaped goods during conditions of movement. It would be of significant advantage to eliminate the common practice of tightly packaging goods in packaging containers, or packaging each item separately. It would also be of significant advantage if the current multiple compartment practice requiring the separation of each individual good could be replaced by a retaining system which effectively adhesively immobilized a diverse range of goods upon tangential contact, while also permitting a cohesive release of the goods when needed or desired.

The potential uses of an effective movement-stabilizing combination adapted to prevent repositioning and/or damage of goods during conditions of movement would naturally extend to needs relating to vehicles, as well. Such vehicles are commonly used for transportation purposes, but can also be used for leisure purposes and are frequently stocked with amenities found in the home. Accordingly, shelves, drawers, tables, consoles, etc. of such leisure vehicles are customarily stocked with foods, eating and cooking utensils, medications, household hardware, tools, and a host of other staple items adapted to provide the convenience of a home-away-from-home. However, unlike a residential home, such vehicles are inevitably prone to a host of movement-inducing forces which will readily dislodge a stowed item from its desired placement, often leading to a messy displacement of, or damage to, the dislodged item.

A transport stabilizing combination which stabilizes goods of virtually any size and shape against movement via an adhesive, cohesive, releasable and reusable viscoelastomeric thermoset system would provide a significant advance within the field of goods exposed to conditions of movement.

SUMMARY OF THE INVENTION

The invention of the present disclosure solves one or more of the problems and/or needs discussed above. More particularly, one or more of the aforementioned desired advantages, as well as other unexpected advantages, can be achieved by providing a transport-stabilizing combination which stabilizes goods of virtually any size and shape against conditions of movement via an adhesive, cohesive, releasable and reusable viscoelastomeric thermoset system.

The perplexing problem of restraining items against conditions of movement in an orderly, stabilized and openly accessible form has been effectively overcome by overlaying a suitable vehicular supportive member (e.g., console, drawer, shelf, dashboard, seat, floor board, deck, hanging substrate, etc.) with a thermoset viscoelastomeric overlay having sufficient adhesiveness to adhesively adhere and restrain a host of items (e.g., transportable items), while also permitting a cohesive release of the items when desired. Applicant's Nonprovisional U.S. patent application Ser. No. 15/731,815 entitled "Adhesive Viscoelastomer and Its Use in Stabilized Storage Containers" referenced above discloses a unique releasable, reusable, washable, cohesive and adhesive viscoelastomeric thermoset which especially affords a unique efficacy in stabilizing stowed items against repositioning and potential damage during conditions of movement.

In addition, maintaining sanitary conditions within a mobile environment can be a particularly difficult objective, especially under tacky or sticky (i.e., adhesive) conditions. Common adhesives are customarily prone to harboring pathogens and airborne contaminants (e.g., germs, dust, pollen, etc.). Surprisingly, the unique viscoelastomeric thermoset overlays provided by this invention also possess unique antipathogenic properties. Furthermore, the viscoelastomeric thermoset overlay component can be readily cleansed of contaminants by simple washing with water and a soap detergent (e.g., via hand washing, dishwashing, machine washing, etc.). In some aspects, such washing can further restore the adhesiveness of the overlay to a level that is at, or near, its original state.

In some preferred embodiments, the transport stabilizing combination which can stabilize an item during conditions of movement comprises a vehicular support member having at least one exposed surface, and a cohesive and adhesive viscoelastomeric thermoset overlay, where the viscoelastomeric thermoset overlay is disposed upon the at least one exposed surface of the vehicular support member. In additional aspects, the transport stabilizing combination further comprises a vehicle.

In some aspects, the viscoelastomeric thermoset overlay is formed from a thermosetting reaction media comprising (based on the total reaction media weight) about 1 wt % to about 10 wt % isocyanate prepolymer, about 35 wt % to about 70 wt % polyols, and about 20 wt % to about 55 wt % plasticizer, where the polyols comprise a straight chain linking diol and a crosslinking triol present in a diol to triol weight ratio of about 1:3 to about 3:1, and where the plasticizer comprises about 20 wt % to about 50 wt % of the total reaction media weight triglyceride plasticizer and about 0 wt % to about 40 wt % of the total reaction media weight ester plasticizer. In some further aspects, the isocyanate prepolymer comprises a diisocyanate prepolymer. In other aspects, the straight chain linking diol comprises a polyether diol and the crosslinking triol comprises a polyether triol. In yet other aspects, the polyether diol and the polyether triol each have a molecular weight of about 1,000 to about 10,000. In still other aspects, the triglyceride plasticizer and the ester plasticizer are present in the thermosetting reaction media in a triglyceride plasticizer to ester plasticizer weight ratio of about 1:0 to about 1:1. In yet other aspects, the triglyceride plasticizer comprises an epoxidized triglyceride plasticizer. In still other aspects, the epoxidized triglyceride plasticizer comprises an epoxidized vegetable oil. In some further aspects, the epoxidized vegetable oil comprises an epoxidized soybean oil. In other aspects, the ester plasticizer has a dipole moment of at least 1.5 debyes (D). In yet other aspects, the ester plasticizer has a molecular weight of less than about 750. In some further aspects, the ester plasticizer is selected from the group consisting of sebacates, adipates, phthalates, isophthalates, maleates, azelates and glutarates. In yet further aspects, the ester plasticizer comprises dibutyl sebacate. In still further aspects, the dibutyl sebacate is present in an amount of about 2 wt % to about 20 wt % of the total reaction media weight.

In some aspects, the thermosetting reaction media is reacted in the presence of a catalytic amount of a catalyst. In some further aspects, the catalyst is an organobismuth catalyst. In other aspects, the transport stabilizing combination comprises a colorant. In yet other aspects, the transport stabilizing combination comprises a UV inhibitor.

In some aspects, the viscoelastomeric thermoset overlay has been prefabricated prior to being disposed upon the at least one exposed surface of the vehicular support member. In some further aspects, such viscoelastomeric thermoset overlay has a thickness of about 1 mm to about 25 mm.

In some aspects, the viscoelastomeric thermoset overlay has been cured in situ upon the at least one exposed surface of the vehicular support member. In some further aspects, such viscoelastomeric thermoset overlay has a thickness of about 0.3 mm to about 20 mm.

In some aspects, a transport stabilizing combination for adhesively restraining and cohesively releasing a portable item stowed at a stabilized position comprises a vehicle, a vehicular support member disposed upon the vehicle and having a sufficient size and structural integrity to support a desired portable item, and a viscoelastomeric thermoset overlay possessing sufficient adhesiveness and cohesiveness to restrain the portable item at a stabilized position and to release the portable item upon application of a force sufficient to overcome an adhesive attraction between the portable item and the viscoelastomeric thermoset overlay while leaving no more than a nominal amount of a polymer residue upon the portable item, where the viscoelastomeric thermoset overlay is disposed upon at least a portion of the vehicular support member.

In some further aspects, the viscoelastomeric thermoset overlay comprises a substantially uniform admixture (based on the total viscoelastomeric thermoset overlay weight) of about 4 wt % to about 8 wt % diisocyanate prepolymer, about 35 wt % to about 70 wt % polyols, and about 20 wt % to about 55 wt % plasticizer, where the polyols comprise polyether diols and polyether triols in a diol to triol weight ratio of about 3:1 to about 1:3, and where the plasticizer comprises about 20 wt % to about 50 wt % epoxidized triglyceride plasticizer and about 0 wt % to about 40 wt % ester plasticizer. In some further aspects, the diisocyanate prepolymer comprises methylene diphenyl diisocyanate. In other aspects, the epoxidized triglyceride plasticizer comprises an epoxidized vegetable oil plasticizer. In some further aspects, the epoxidized vegetable oil plasticizer comprises epoxidized soybean oil. In other aspects, the ester plasticizer comprises dibutyl sebacate.

In some aspects, the vehicular support member is flexible. In other aspects, the vehicular support member is rigid. In still other aspects, the vehicular support member can be a combination of flexible and rigid portions.

In some aspects, a method for making a transport stabilizing combination for stabilizing a portable item during conditions of movement comprises:

A. providing a vehicle comprising a vehicular support member having at least one exposed surface;

B. providing a thermosetting reaction media comprising (based on the total thermosetting reaction media weight):
  1) about 1 wt % to about 10 wt % diisocyanate prepolymer,
  2) about 10 wt % to about 40 wt % polyether diol having a molecular weight ranging from about 2,000 to about 6,000,
  3) about 10 wt % to about 50 wt % polyether triol having a molecular weight ranging from about 3,000 to about 7,000,
  4) about 20 wt % to about 50 wt % epoxidized vegetable oil plasticizer, and
  5) about 0 wt % to about 40 wt % ester plasticizer having a molecular weight of less than about 750;

C. disposing a quantity of the thermosetting reaction media upon the at least one exposed surface of the vehicular support member; and D. allowing the quantity of the thermosetting reaction media to fully cure to form a viscoelastomeric thermoset overlay, thus providing the transport stabilizing combination.

In some further aspects, the diisocyanate prepolymer comprises methylene diphenyl diisocyanate. In other aspects, the epoxidized vegetable oil plasticizer comprises epoxidized soybean oil. In yet other aspects, the ester plasticizer comprises dibutyl sebacate. In other aspects, the "allowing" step is performed prior to the "disposing" step, where the allowing step comprises allowing a quantity of the thermosetting reaction media to fully cure to form a viscoelastomeric thermoset overlay, and where the disposing comprises disposing the viscoelastomeric thermoset overlay upon the at least one exposed surface of the vehicular support member, to provide the transport stabilizing combination.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5, as well as fractions thereof within the range.

BRIEF DESCRIPTION OF THE DRAWINGS

The foregoing and other features, aspects and advantages of the present invention will become better understood with regard to the following description, appended claims and accompanying drawings where:

FIG. 6 is a top view showing a vehicle in the form of an automobile having a transport stabilizing combination of the present disclosure comprising a vehicular support member and a viscoelastomeric thermoset overlay disposed thereupon, and further comprising stabilized items in the form of skis adhesively engaged to the transport stabilizing combination.

Figure 1:
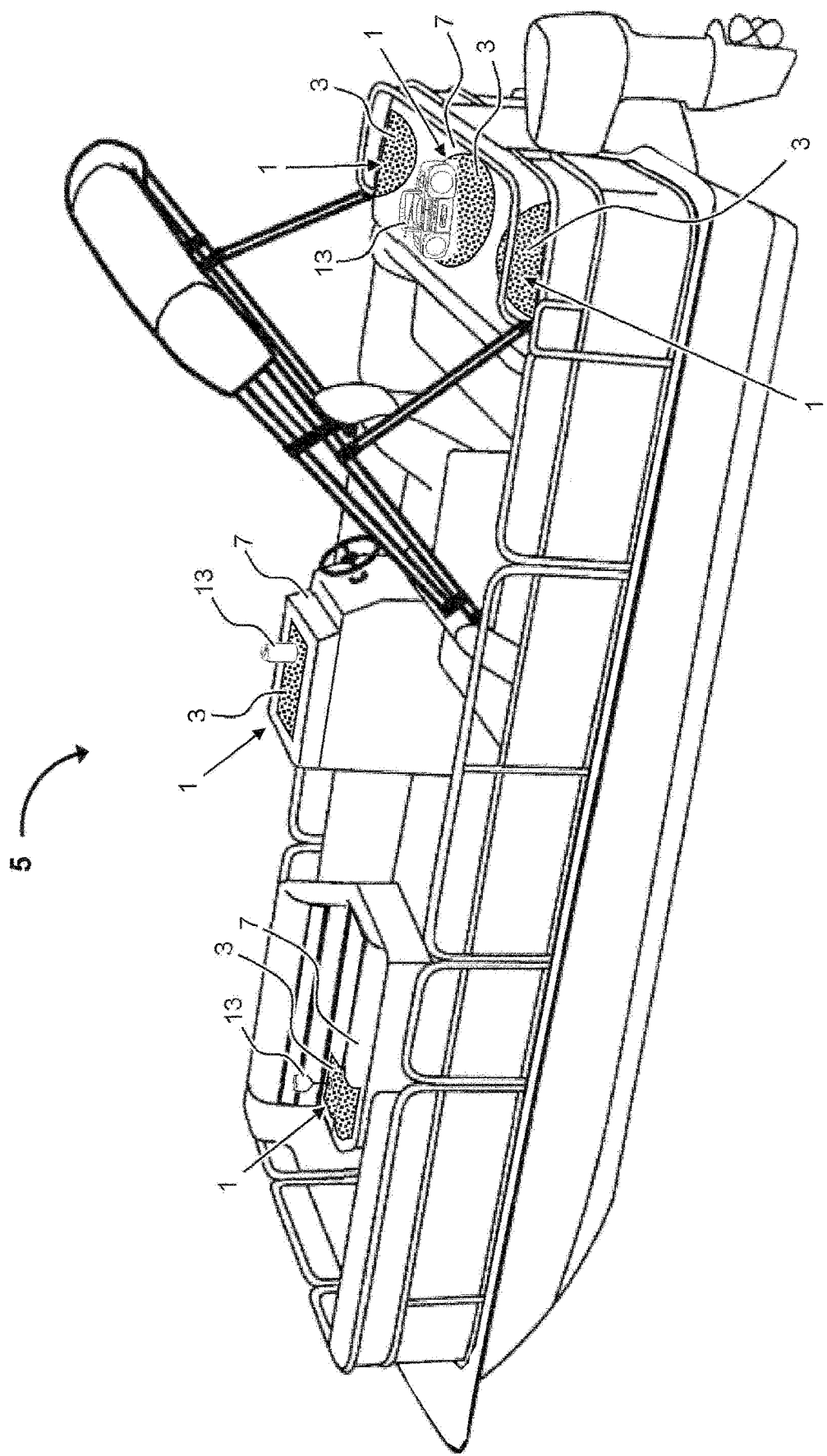
FIG. 1 is a perspective view showing a vehicle in the form of a watercraft having three (3) transport stabilizing combinations of the present disclosure, each comprising a vehicular support member and one or more viscoelastomeric thermoset overlays disposed thereupon, and further comprising a stabilized item adhesively engaged to each transport stabilizing combination.
Figure 2A:
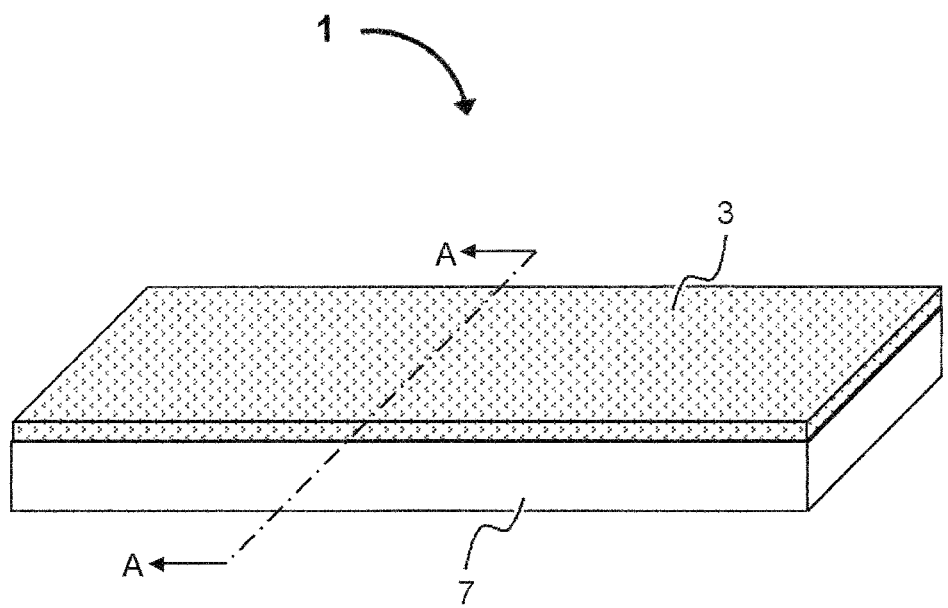
FIG. 2A is a perspective view showing a transport stabilizing combination of the present disclosure comprising a viscoelastomeric thermoset overlay disposed upon a vehicular support member.
Figure 2B:
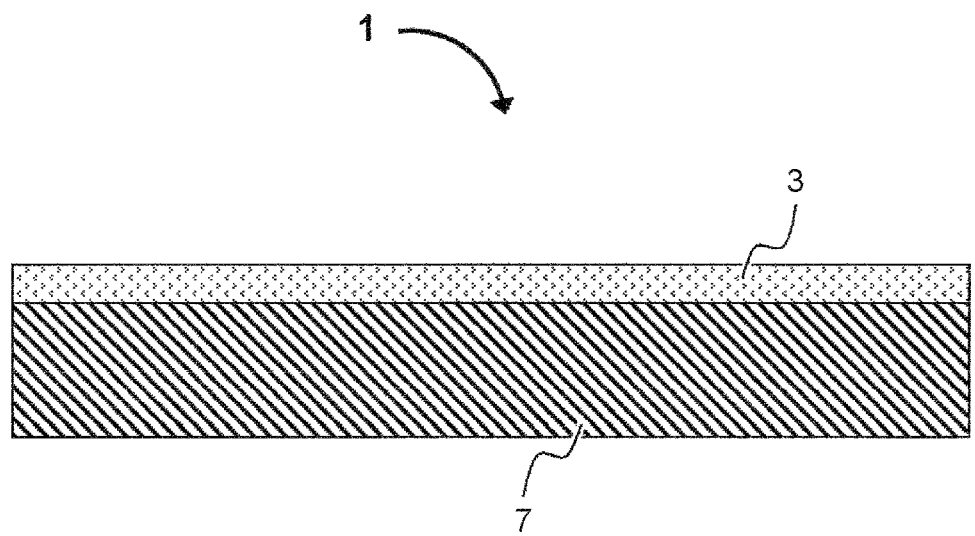
FIG. 2B is cross-sectional view of FIG. 2A taken along line A-A.
Figure 3:
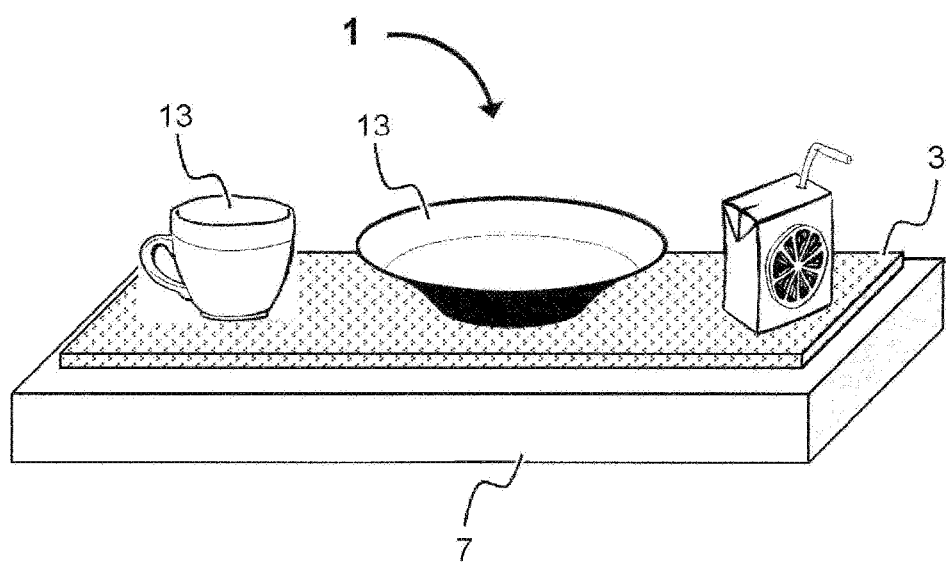
FIG. 3 is a perspective view showing a transport stabilizing combination of the present disclosure comprising a viscoelastomeric thermoset overlay disposed upon a vehicular support member, and further comprising an array of items adhesively engaged to the transport stabilizing combination.
Figure 4:
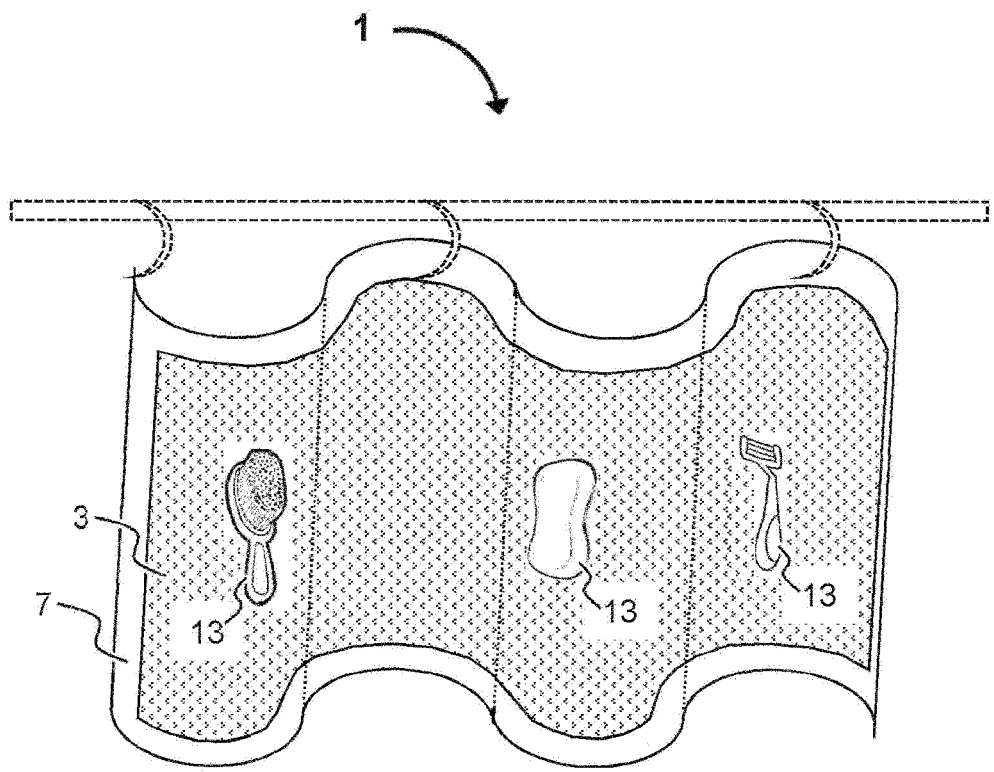
FIG. 4 is a perspective view showing a transport stabilizing combination of the present disclosure comprising a viscoelastomeric thermoset overlay disposed upon a vehicular support member in the form of a hanging substrate in a vertical configuration, and further comprising an array of items adhesively engaged to the transport stabilizing combination.

Repeated use of reference characters in the present specification and drawings is intended to represent the same or analogous features or elements of the present invention.

Definitions

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should be noted that, when employed in the present disclosure, the terms "comprises," "comprising" and other derivatives from the root term "comprise" are intended to be open ended terms that specify the presence of any stated features, elements, integers, steps, components, or groups, and are not intended to preclude the presence or addition of one or more other features, elements, integers, steps, components, or groups thereof.

As used herein with respect to the viscoelastomeric thermoset overlay, the terms "adhesive" and "adhesiveness" refer to the overlay exhibiting tackiness to which a compatible item will stick or hold fast.

As used herein, the term "catalytic amount" is a term of the art which is recognized by persons having skill in the art and refers to an amount that is enough to obtain a desired response or result.

As used herein with respect to the viscoelastomeric thermoset overlay, the terms "cohesive" and "cohesiveness" refer to exhibiting a molecular attraction by which the molecules of the overlay are united throughout the mass such that the overlay retains its structural integrity when subjected to separating forces to remove an item therefrom.

As used herein, the term "effective amount" refers to the amount required to obtain a desired result.

As used herein, the term "reaction media" refers to an uncured or partially cured mixture of chemicals which, upon fully curing, forms the viscoelastomeric thermoset overlay of the present invention.

As used herein, the term "reaction product" refers to the resulting product obtained upon curing the reaction media to form the viscoelastomeric thermoset overlay of the present invention.

As used herein with respect to the viscoelastomeric thermoset overlay, the terms "releasable" and "releasability" refer to the setting free from restraint or disengagement of an item from the overlay.

As used herein, the term "transport" refers to the movement or relocation of an item from one place or position to another.

The terms "viscoelastomeric" and "viscoelastic" are used interchangeably herein to refer to a substance having viscous and elastic properties.

These terms may be defined with additional language in the remaining portions of the specification.

DETAILED DESCRIPTION

The invention is generally directed to an inventive transport stabilizing combination comprising a vehicular support member upon which a viscoelastomeric thermoset overlay is disposed. Such transport stabilizing combination can exhibit, inter alia, unique viscoelastic, adhesive, cohesive, releasability, cleansability, and/or antipathogenic properties.

The unique transport stabilizing combinations of the present invention are provided by incorporating a unique adhesive, cohesive, releasable, antipathogenic and cleansable thermoset viscoelastomeric polymer component in the form of a viscoelastomeric thermoset overlay onto a surface of a vehicular support member so as to operationally interface with and engage a surface of an item disposed thereupon. In one aspect of the present invention, a particularly effective viscoelastomeric thermoset overlay component is derived from a thermoset reaction product prepared from a thermosetting reaction media comprising a substantially uniform admixture of about 1 percent to about 10 percent by weight (wt %) of an isocyanate prepolymer, about 35 wt % to about 70 wt % polyols wherein the polyols consist essentially of straight chain linking diols and a cross-linking triols, each having repetitive ether groups at a diol to triol weight ratio ranging from about 1:3 to about 3:1, and from about 20 wt % to about 55 wt % of a plasticizer containing less than about 50 wt % (with respect to the total reaction media weight) of an epoxidized triglyceride plasticizer and from about 0 wt % to about 40 wt % (with respect to the total reaction media weight) of an ester plasticizer, with the plasticizer being uniformly and cohesively dispersed and bound throughout the reaction product. Typically, suitable polyols will be comprised of liquid polyethers (e.g., polyether diol and polyether triol) having a molecular weight of about 1,000 to about 20,000.

Although several exemplary embodiments of the present invention will be described herein, it should be understood that the disclosed embodiments are intended merely as non-limiting examples of the invention that may be embodied in various forms. Therefore, specific details disclosed herein, such as relating to composition, structure, function, and the like, are not to be interpreted as limiting in any manner whatsoever, but rather only as one of numerous example bases for claims and/or teaching persons having ordinary skill in the art to variously employ the present invention in virtually any appropriately detailed structure or circumstance.

The invention may be better understood with reference to the Figures. Referring to FIGS. 1-6, the present invention provides an inventive transport stabilizing combination 1 comprising a viscoelastomeric thermoset overlay 3 disposed upon a vehicular support member 7. The transport stabilizing combination 1 is adapted to stabilize items 13 (e.g., portable items, such as transportable items) against movement (i.e., with respect to the vehicular support member 7). Irrespective of the type of vehicle 5 (e.g., watercraft, wheeled transport, aircraft, spacecraft, manual and motorized transports, wagons, conveyors, trailers, carts, wheel chairs, bicycles, hang gliders, scooters, cars, trucks, buses, trains, motor homes, golf carts, ATV's, snowmobiles, combines, harvesters, tractors, etc.), the present invention provides a surprisingly effective means for stabilizing a wide assortment of items 13 against movement. Since the unique viscoelastomeric thermoset overlay 3 used herein effectively adhesively restrains items 13 emplaced thereupon in a steadfast restrained position, conventional compartmentalized sections, side rails, confining covers or other common conventional restraints are generally unnecessary to restrain the items 13 against movement.

It has been discovered herein that by equipping a vehicular support member 7 (also referred to herein as a "support member" or "supportive base") of a vehicle 5 with the inventive viscoelastomeric thermoset overlay 3 of this disclosure, a unique transport stabilizing combination 1 is thereby provided which effectively stabilizes portable items 13 against movement, spillage, and/or potential damage (as well as providing a host of other beneficial attributes) during potential incidents of movement. The viscoelastomeric thermoset overlay 3, when overlaid upon an exposed surface of a vehicular support base 7, affords a surprisingly unique viscoelastomeric, adhesive, cohesive, releasable, antipathogenic, reusable and washable transport stabilizing combination 1, which results in unexpectedly superior protection of the item 13.

Referring now to FIG. 1, the transport stabilizing combination 1 comprises a mobile carrier 5 (i.e., a vehicle in the form of a watercraft) equipped with a vehicular support member 7 for supporting one or more items 13 during conditions of movement (i.e., the vehicle is not necessarily required to be in a transport operation, such as a watercraft rocking back and forth upon waves), and a cohesive and adhesive viscoelastomeric thermoset overlay 3 disposed upon the support member 7, positioned so as to adhesively engage and stabilize an item 13 adhered thereto against movement, while also allowing for a cohesive release of the item 13 by applying a sufficient counteracting force to overcome the adhesive attraction between the overlay 3 and the item 13.

Returning now to FIGS. 1-6, the transport stabilizing combination 1 comprises a vehicular support member 7 (which may be previously part of, or subsequently added to, a vehicle 5). The vehicular support member 7 should have a sufficient size and configuration to provide structural support for a desired item 13, or array of items, to be stabilized thereby. The particular tangible item(s) 13 will ultimately dictate the type of structural support member 7 desired or required. In general, suitable vehicular support members 7 can include rigid support members (e.g., shelves, drawers, dashboards, consoles, etc. comprising rigid plastics, wood, metal, etc.), as well as flexible support members (e.g., flexible plastics, leather, woven fabrics, paper, cardboard, rubber, foams, etc.).

The vehicular support member 7 also provides a supportive structure for the viscoelastomeric thermoset overlay 3. As discussed further below, the viscoelastomeric thermoset overlay 3 may be disposed onto the vehicular support member 7 as a prefabricated overlay substrate which is adhesively applied to the vehicular support member 7, or by applying uncured or partially cured overlay thermosetting reaction media onto the vehicular support member 7 and thereafter allowing the reaction media to fully cure in situ, to provide a viscoelastomeric thermoset overlay 3 which is tenaciously bonded to the vehicular support member 7. It is postulated that a prefabricated overlay attaches to a support member via adhesive bonding, and that an overlay prepared by curing in situ attaches to a support member via adhesive bonding and chemical bonding.

The vehicular support member 7 may be comprised of any natural or synthetic material useful in providing suitable support for a desired item 13, and which contributes to an overall attachment force of the viscoelastomeric thermoset overlay 3 component of the transport stabilizing combination 1 which is greater than the adhesive force between the item 13 and the overlay 3. The support member 7 may be of any desired size and shape. Examples of materials which can be suitable as a vehicular support member 7 include, but are not limited to, natural, synthetic and fabricated materials such as wood, particle board, cardboard, metal, glass, polyesters, polyethylene, polypropylene, nylon, rayon, Dacron, manila, polyethylene terephthalate, polyamides, polyurethane, linen, jute, polyacetates, polyacrylics, spandex, latex, Orlon, cotton, silk, velvet, canvas, leather, fiberglass, acrylonitrile-butadiene-styrene polymers, polystyrene, lacquer, enamel, latex, and combinations thereof, as well as a host of other such synthetic and/or natural substances which can adhesively engage or embed the overlay 3.

It has been discovered herein that certain materials exhibit an attachment force thereto of the viscoelastomeric thermoset overlay 3 herein which may be less than the adhesive force between an item 13 and the overlay 3 (e.g., flat and smooth surfaced PVC materials, Teflon® and paraffin-coated substrates). Such flat and smooth materials would typically not be desirable for use as a vehicular support member 7 (unless the surface comprised anchoring sites for the overlay 3 or otherwise provided an overall attachment force to the viscoelastomeric thermoset overlay 3 herein which is greater than the adhesive force between an item 13 and the overlay 3). Accordingly, such flat and smooth surfaced materials which exhibit an attachment force thereto of the overlay 3 herein which is less than the adhesive force between an item 13 and the overlay 3 can be suitable for use as molds or as protective covers 9 for the viscoelastomeric thermoset overlays 3 (further discussed below).

In general, the vehicular support member 7 may have any desired shape (e.g., rectangular, cubical, trapezoidal, triangular, spherical, ovular, etc.) and can be appropriately sized to accommodate a particular item 13 or group of items. In addition, there are generally no particular dimension limitations of the vehicular support member 7. For example, in one non-limiting exemplary embodiment, the support member 7 can have a generally cubical shape having a length of less than about 3 meters and a width of less than about 2 meters, such as a length of less than about 30 cm and a width of less than about 20 cm, or a length of less than about 3 cm and a width of less than about 2 cm. However, such non-limiting embodiment can have length and/or width dimensions which are greater than 3 meters and/or 2 meters, respectively, without departing from the scope of the invention. Similarly, the support member 7 can have a thickness which may be uniform or non-uniform. In general, there is no particular limit to the thickness, provided that the support member 7 can sufficiently support an item 13 placed thereupon for stabilization. For example, in one non-limiting exemplary embodiment, the vehicular support member 7 can have a thickness of less than about 1 meter, such as about 1 mm to about 100 cm, or about 5 mm to about 10 cm. However, the support member 7 can have a thickness that is less than about 1 mm or greater than about 1 meter without departing from the scope of the invention.

Since the stabilization of an item 13 against movement includes an effective adhesive attraction between the item 13 and the viscoelastomeric thermoset overlay 3, there exists a substantial latitude as to the requirements of the supportive structural support 7 needed for immobilizing the item 13. For example, unlike conventional frictional pads which generally require a substantially flat and level base surface upon which it is positioned to work effectively, the inherent properties of the inventive viscoelastomeric thermoset overlay 3 (e.g., adhesiveness, viscoelasticity, etc.) affords a much broader range of properties of the vehicular support member 7 to effectively stabilize items 13 against movement including, inter alia, flat or uneven surfaces positioned at any angle ranging between 0° and 360°. This allows certain items 13 to be adhesively retained in an angular position (e.g., horizontal, 45° angle, vertical, upside-down, etc.) for more convenient accessibility. Moreover, the viscoelastomeric thermoset overlay 3 may be effectively used to overlay, coat or impregnate vehicular support members 7 (depending on the support member composition), resulting in a highly versatile system for stabilizing goods 13 against movement.

Continuing with FIGS. 1-6, in addition to the vehicular support member 7, the transport stabilizing combination 1 also comprises a viscoelastomeric thermoset overlay 3 (which can exhibit viscoelastic, adhesive, cohesive, releasability, cleansability, and/or antipathogenic properties, as desired). As illustrated in FIGS. 1-6, the viscoelastomeric thermoset overlay 3 is disposed upon at least a portion of an exposed surface of a vehicular support member 7 which is intended for use with a vehicle 5. The viscoelastomeric thermoset overlay 3 desirably has a sufficient size and configuration to not only suitably fit upon at least a surface of the vehicular support member 7, but also to sufficiently stabilize a desired item 13, or array of items, from movement. The particular vehicular support member 7, as well as the item(s) 13 to be stabilized thereby, will ultimately dictate the size and configuration of the viscoelastomeric thermoset overlay 3. It should be understood that the dimensions of the overlay 3 can be greater than, equal to, or less than the contacting dimensions of an item 13 without departing from the scope of the invention.

Such a unique polymer which forms the viscoelastomeric thermoset overlay 3 may be derived from a thermosetting reaction media comprised of a substantially uniform admixture of an isocyanate prepolymer, prescribed amounts of polyols (e.g., polyether diols and polyether triols) and a carefully controlled ratio of select plasticizers. The isocyanate prepolymer in combination with a controlled amount of polyols in the form of straight chain diols and cross-linking triols provides a thermoset infrastructure for effectively housing the plasticizing components in a form which unexpectedly contributes to the unique viscoelastic, adhesive, cohesive, releasability and antipathogenic attributes, while also permitting a restorative cleansability function via conventional washing and/or autoclaving techniques. In addition, the unexpected cohesive attributes of the viscoelastomeric thermoset overlay 3 prevent plasticizer leakage from the polymer (also referred to as "bleeding"), which solves a long-standing problem of existing adhesive polymers having high plasticizer loadings (i.e., greater than about 10 wt % of the total reaction media weight).

A highly effective thermosetting reaction media for preparing the inventive adhesive and cohesive viscoelastomeric thermoset overlay 3 of the present disclosure comprises a precursor polymer (also referred to herein as a "prepolymer"), polyols and plasticizer. More particularly, the reaction media comprises (i) a prepolymer, such as an isocyanate prepolymer (e.g., a polyol reacted with an isocyanate), preferably a diisocyanate prepolymer (e.g., methylene diphenyl diisocyanate (MDI)), ranging from about 1 wt % to about 10 wt % of the total reaction media weight; (ii) polyols, ranging from about 35 wt % to about 70 wt % of the total reaction media weight, wherein the polyols include straight chain linking polyols (e.g., diols) and cross-linking polyols (e.g., triols); and (iii) plasticizer, ranging from about 20 wt % to about 55 wt % of the total reaction media weight, wherein the plasticizer includes an epoxidized triglyceride plasticizer present in an amount of less than about 50 wt % of the total reaction media weight, such as between about 10 wt % and about 50 wt % of the total reaction media weight, and optionally a viscosity reducing ester plasticizer in an amount of about 0 wt % to about 40 wt % of the total reaction media weight. The inventive overlay polymer can also optionally comprise additional components including, but not limited to, additional plasticizers, catalysts, colorants, UV inhibitors, antioxidants, initiators, and the like, as would be recognized by persons having ordinary skill in the art, without departing from the scope of the invention. It should be noted that the weight of the reaction media and the weight of the resulting reaction product which forms the viscoelastomeric thermoset overlay 3 herein has been observed to be substantially equivalent; thus, the terms may be used interchangeably as a basis when referring to the compositional amount (i.e., percent by weight) of each constituent therein.

As referenced above, the thermosetting reaction media (and thus the resulting reaction product which forms the viscoelastomeric thermoset overlay 3) comprises a quantity of prepolymer which will typically be present in an amount of about 1 wt % to about 10 wt % of the total reaction media weight, such as about 2 wt % to about 9 wt %, or about 3 wt % to about 8 wt %, or about 4 wt % to about 7 wt % of the total reaction media weight. Suitable prepolymers can include a ring-opening species of a hardener (e.g., amines, amides, mercaptans, anhydrides, isocyanates including polyisocyanates such as a diisocyanate, etc.). Suitable polyisocyanates include, but are not limited to, aromatic diisocyanates (e.g., diphenylmethane diisocyanate, methylene diphenyl diisocyanate (MDI), toluene diisocyanate (TDI), etc.) and aliphatic diisocyanates (e.g., hexamethylene diisocyanate (HDI), isophorone diisocyanate (IPDI), etc.) in a conventional prepolymer form. In one non-limiting example, a methylene diphenyl diisocyanate (MDI) designated as ELASTOCAST TQZ-P23, available from BASF Corporation, having a place of business located in Florham Park, N.J., U.S.A., can provide a suitable prepolymer to form the viscoelastomeric thermoset overlay 3 of the present disclosure, and ultimately the inventive transport stabilizing combination 1 thereof.

As referenced above, the viscoelastomeric thermoset overlay 3 also comprises a quantity of polyols, typically ranging from about 35 wt % to about 70 wt % of the total reaction media weight, such as about 40 wt % to about 50 wt % of the total reaction media weight. More particularly, the polyols include straight chain linking polyols and cross-linking polyols. In some desirable aspects, the straight chain linking polyols can be in the form of diols, and the cross-linking polyols can be in the form of triols (e.g., a diol having two terminal hydroxyl groups, and a triol having two terminal hydroxyl groups and one additional functional hydroxyl group). The diol and triol components of the overlay 3 are typically liquid at room temperature (i.e., about 21° C.) and generally have a molecular weight of about 1,000 to about 20,000, such as about 1,000 to about 15,000, or about 1,000 to about 10,000. The adhesiveness and cohesiveness of the overlay 3 depend upon using a controlled polyol balance within the thermosetting reaction media. It has been discovered herein that the amount of diols and triols (preferably reacted in the presence of an effective amount of plasticizer within the reaction media) can suitably fall within a prescribed diol to triol weight ratio of about 1:3 to about 3:1, such as about 1:2 to 2:1, or about 7:13 to about 13:7, to provide the desired viscoelastic, adhesive, cohesive, releasability, cleansability, and/or antipathogenic attributes for effective use herein. The content and type of polyols can have a pronounced effect upon imparting the necessary thermoset polymeric infrastructure for obtaining the overlay 3 attributes herein. It has been discovered herein that when the weight ratio of diols to triols deviates outside a range of about 1:3 to about 3:1, the resultant reaction product will typically fail to provide the desired adhesive and cohesive release attributes for effective use herein. Thus, a controlled balance within the cited range between the straight chain linking diols and the cross-linking triols can provide an effective reaction media for preparing a thermoset viscoelastomeric reaction product (which forms the viscoelastomeric thermoset overlay 3) uniquely possessing the adhesive, cohesive, releasability, cleansability, and antipathogenic compositional properties for the inventive transport stabilizing combination 1 of the present disclosure.

In general, the diol component of the overlay 3 can provide straight chain infrastructure formation and sufficient cross-linkage disruption and to permit for a highly effective intermolecular plasticizer attraction and alignment, thus providing for a highly effective loading of the adhesive, cohesive and antipathogenic contributing plasticizer co-factors. In some desirable aspects, the straight chain diol can be provided by a polyether diol having a molecular weight suitably ranging from about 1,000 to about 10,000, such as about 1,000 to about 8,000, or about 2,000 to about 6,000, and preferably having two (2) terminal hydroxyl groups. Such polyether diol can be suitably present in an amount ranging from 10 wt % to about 40 wt % of the total reaction media weight, such as about 10 wt % to about 20 wt % of the total reaction media weight. In one example, a 2-functional polyether diol, designated as ELASTOCAST C4057, available from BASF Corporation, can provide a suitable diol component to form the viscoelastomeric thermoset overlay 3 of the present disclosure.

In general, the triol component of the overlay 3 can provide sufficient cross-linkage infrastructure to the polymer, and can contribute to the unexpected cohesiveness and releasability attributes thereof. In some desirable aspects, the cross-linking triol can be provided by a polyether triol having a molecular weight suitably ranging from about 1,000 to about 10,000, such as about 2,000 to about 8,000, or about 3,000 to about 7,000, and preferably having three (3) functional hydroxyl groups wherein two (2) of said functional hydroxyl groups are terminal hydroxyl groups. Such polyether triol can be suitably present in an amount ranging from about 10 wt % to about 50 wt % of the total reaction media weight, such as about 20 wt % to about 40 wt %, or about 25 wt % to about 35 wt % of the total reaction media weight. In one example, a 3-functional polyether triol, designated as ELASTOCAST C4018, available from BASF Corporation, can provide a suitable triol component to form the viscoelastomeric thermoset overlay 3 of the present disclosure.

The adhesive properties of the overlay 3 can be tailored to fit the need for any given transportable item 13. Accordingly, the thermosetting reaction media may be properly formulated so as to impart the desired degree of adhesiveness for the stabilization of any given item 13 while still retaining the desired overlay 3 cohesiveness. In general, increasing the diol to triol ratio (i.e., increasing the diol content relative to the triol content) will result in an increased adhesiveness of the overlay 3. Conversely, decreasing the diol to triol ratio (i.e., increasing the triol content relative to the diol content) will generally result in an increased cohesiveness of the overlay 3. Thus, controlling the diol to triol weight ratio within the range of about 3:1 to about 1:3 will result in an overlay 3 having the desired adhesiveness and cohesiveness for any particular item 13.

As referenced above, the viscoelastomeric thermoset overlay 3 also comprises a quantity of plasticizer typically ranging from about 20 wt % to about 55 wt % of the total reaction media weight, such as about 30 wt % to about 50 wt % of the total reaction media weight. More particularly, the plasticizer includes a triglyceride plasticizer, and can additionally optionally include a process aid (i.e., viscosity reducing) plasticizer. In some desirable aspects, the triglyceride plasticizer is an epoxidized triglyceride plasticizer, and the process aid plasticizer is an ester plasticizer. The plasticizer components of the overlay 3 are typically liquid at room temperature (i.e., about 21° C.). It has been discovered herein that the weight ratio of triglyceride plasticizer to ester plasticizer can suitably fall within a prescribed weight ratio range of about 1:0 to about 1:1, such as about 3:1 to about 2:1, to provide the desired viscoelastic, adhesive, cohesive, releasability, cleansability, and/or antipathogenic attributes for effective use herein. The content and type of plasticizers can have a pronounced effect upon imparting the desired overlay 3 attributes herein. Thus, a controlled amount of triglyceride plasticizer (e.g., epoxidized triglyceride plasticizer) and ester plasticizer within the prescribed range can provide an effective reaction media for preparing an overlay 3 uniquely possessing the desired compositional attributes for use herein. Desirably, the plasticizer component is uniformly dispersed and cohesively bound throughout the thermosetting reaction media (along with the other polymerizable thermosetting components) and will tenaciously remain uniformly dispersed within the resultant viscoelastomeric thermoset overlay 3 in a highly cohesive, stabilized form (e.g., the plasticizer component will not leak or bleed from the overlay 3).

Suitable triglyceride plasticizers for preparing the viscoelastomeric thermoset overlay 3 desirably includes epoxidized triglyceride plasticizers. Epoxidized triglyceride plasticizers, such as epoxidized animal oils and epoxidized vegetable oils, are particularly effective as a plasticizer component in the thermosetting viscoelastomeric reaction media herein. Amongst the suitable epoxidized triglyceride plasticizers, epoxidized vegetable oils (e.g., soybean, castor, corn, cottonseed, *perilla*, safflower, linseed, tall, etc.) have been found to be highly effective triglyceride plasticizers herein. Other suitable triglyceride plasticizers have been more extensively described in the aforementioned cross-referenced related applications. Such triglyceride plasticizers can be suitably present in an amount that is less than about 50 wt % of the total reaction media weight, such as about 10 wt % to about 50 wt %, or about 20 wt % to about 50 wt %, or about 20 wt % to about 48 wt % of the total reaction media weight. In one desirable example, epoxidized soybean oil can provide a particularly suitable triglyceride plasticizer to form the viscoelastomeric thermoset overlay 3 of the present disclosure.

As referenced above, the viscoelastomeric thermoset overlay 3 can also comprise a suitable process aid (i.e., viscosity reducing) plasticizer. Exemplary process aid plasticizers for preparing the viscoelastomeric thermoset overlay 3 can include ester plasticizers. Such ester plasticizers are especially effective as an additional plasticizer component in the thermosetting viscoelastomeric reaction media. Suitable ester plasticizers typically have a relatively low molecular weight of less than about 750, such as less than about 500, and can include, but is not limited to, the condensation products of alcohols (e.g., $C_1$ to $C_{10}$ alcohols, such as $C_2$-$C_6$ alcohols) and dicarboxylic acids (e.g., $C_2$-$C_{12}$ dicarboxylic acids, such as $C_4$-$C_8$ dicarboxylic acids). In addition, amongst the more fluid ester plasticizers, such as diester plasticizers for example, are the lower dialkyl esters of dicarboxylic acids, such as dialkyl esters having alkyl groupings of less than 12 carbon atoms, more particularly $C_1$-$C_8$ dialkyl ester groupings of sebacates, adipates, phthalates, isophthalates, maleates, azelates, glutarates, etc., which have been found to be particularly effective ester plasticizers herein. In addition, in some aspects, suitable ester plasticizers can have a dipole moment of greater than 1.5 debyes (D), and typically greater than 2.0 D. The ester plasticizers can be suitably present in an amount ranging from about 0 wt % to about 40 wt % of the total reaction media weight, such as about 1 wt % to about 20 wt %, or about 5 wt % to about 15 wt % of the total reaction media weight. In one non-limiting example, dibutyl sebacate can provide a particularly suitable ester plasticizer to form the viscoelastomeric thermoset overlay 3 of the present disclosure.

In some aspects, the incorporation (within the ranges prescribed herein) of the relatively low molecular weight ester plasticizer in combination with triglyceride plasticizer can be utilized herein to provide an easier fabricating form (e.g., for casting, molding, injecting, pouring, spraying, printing, etc.) of the uncured polymer mix by lowering its viscosity without adversely affecting its desirable thermoset properties. For example, the addition of, or substitution of the triglyceride plasticizers with, polar ester plasticizers has been found to maintain a desired level of adhesiveness and cohesiveness while still retaining excellent releasability and stability properties. It has been discovered herein that including an ester plasticizer having a fluid consistency at room temperature (i.e., about 21° C.) and having a relatively low molecular weight (described above) in the reaction media can contribute to ideal working viscosities during the initial curing stages, rendering the coating of the reaction media product onto the vehicular support member 7 to be more effective for forming the transport stabilizing combination 1. Inclusion of an ester plasticizer can be particularly desirable where uncured reaction media is first applied to the vehicular support member 7, and then cured in situ, to form a tenacious bonding between the resulting overlay 3 and the support member 7.

As referenced above, the plasticizer is desirably uniformly incorporated into the thermosetting reaction media (along with the other polymerizable thermosetting reactants) and will tenaciously remain uniformly dispersed within the resultant thermoset reaction product (i.e., which forms the viscoelastomeric thermoset overlay 3 herein) in a highly cohesive and stabilized form. The thermosetting diols and triols, in cooperative combination with the plasticizer, create a thermoset viscoelastomeric polymeric structure possessing a high degree of compositional adhesiveness and cohesiveness which is desirable to adhesively secure and retain a transportable item 13, while also allowing for a clean cohesive separation of the item 13 from the overlay 3 (upon application of a sufficient force to overcome the adhesive force thereof), desirably leaving no visually detectable polymeric residue on the item 13. Controlling the reaction media weight ratio of triglyceride plasticizer and optional ester plasticizer (along with the diol to triol weight ratios) accordingly constitutes an important consideration in preparing the viscoelastomeric thermoset overlay 3. For example, if the amount of plasticizer is excessively high (i.e., outside the range prescribed herein), the resultant overlay 3 will tend to lose its desired cohesiveness, and will then tend to bleed plasticizer. It has been found that increasing the triol content can partially arrest such plasticizer bleeding, but will then tend to result in an undesirable decrease in adhesiveness.

The unique cross-linked polymeric structure of the thermoset polymerizate obtained from an appropriate thermoset reaction media provides an ideal infrastructure for effectively harboring plasticized overlays 3 in an unexpectedly superior cohesive and adhesive form. Indeed, it appears that the cross-linked infrastructure and the polarity provided by the polymerized polyether diols and polyether triols orients the polarized plasticizer within the thermoset reaction product so as to impart, inter alia, the unexpected viscoelastic, adhesive, cohesive and antipathogenic properties to the reaction product overlay 3 herein.

As referenced above, the viscoelastomeric thermoset overlay 3 can also optionally comprise additional components including, but not limited to, catalysts, other additional plasticizers, colorants, UV inhibitors, antioxidants, initiators, and the like, as would be recognized by persons having ordinary skill in the art, without departing from the scope of the invention. For example, the polymerization of the thermosetting reaction media can be carried out in the presence of a catalyzing amount (defined above) of a catalyst to control the curing rate of the reaction media. Suitable catalysts can include tertiary amines, tertiary phosphines, strong bases (e.g., alkali, alkaline earth metal hydroxides, alkoxides, phenoxides, etc.), acidic metal salts of strong acids, metal chelates, metal alcoholates, metal phenolates, organic acid salts, organo metallic derivatives, etc. In one non-limiting example, an organobismuth catalyst, available under the trade name COSCAT 83 (available from Vertellus Holdings LLC, having a place of business located in Zeeland, Mich., USA), can provide a suitable catalyst for controlling the curing rate of the thermosetting reaction media to form the viscoelastomeric thermoset overlay 3.

Procedurally, the reaction product which forms the viscoelastomeric thermoset overlay 3 can be prepared from a thermosetting reaction media homogeneously loaded with plasticizer(s) which includes a triglyceride plasticizer (e.g., desirably an epoxidized triglyceride plasticizer, such as epoxidized vegetable oil) as well as optionally any other effective polar plasticizer, coupled with a carefully measured ratio of cross-linking polyols to straight chain producing diols to create the necessary bridging therebetween, and an isocyanate prepolymer hardener (e.g., diisocyanate, such as aliphatic, aromatic, heterocyclic, etc., polyisocyanates, and cycloaliphatic and arylaliphatic isocyanates) in the presence of an appropriate catalyst (e.g., preferably a relatively slow acting catalyst). The reaction media desirably contains the necessary plasticizer loading specifically adapted to provide a curable reaction media, which upon curing, produces a viscoelastomeric reaction product having a unique polymerizate structure effectively loaded with polar oriented plasticizers uniformly and homogeneously distributed throughout its entire thermoset mass, intertwined therewithin, and supported by the flexible, plasticizer entrapping, thermoset polymerizate structure. Under the most effective thermosetting and fabricating conditions, the thermosetting polymerizate reactants and the plasticizers are collectively provided in the reaction media as liquids at room temperature (i.e., about 21° C.) without necessitating the use of any solvents, other chemical dispersion aids or elevated temperatures, in order to homogeneously disperse the reaction media components. Accordingly, this allows the thermosetting reaction to be effectively conducted at room temperature.

The cross-linked polymeric structure of the thermoset polymerizate obtained from an appropriate thermoset reaction media provides an ideal infrastructure for effectively harboring plasticizer components in an unexpectedly desirable adhesive and cohesive form, while also providing unexpected antipathogenic properties. Desirably, the plasticizer is uniformly incorporated throughout the reaction media containing the polymerizable components, and remains uniformly dispersed within the resultant polymer in a highly cohesive form, thus preventing leakage of the plasticizers therefrom. It appears that the cross-linked infrastructure and the polarity provided by the polymerized diols and triols (e.g., polyether diols and polyether triols) orients the polarized plasticizer components within the thermoset reaction product to impart the unexpected viscoelastic, adhesive, cohesive, releasability, cleansability, and antipathogenic properties to the viscoelastomeric thermoset overlay 3 herein. Thus, the thermosetting diols and triols in cooperative combination with the plasticizer create a thermoset polymeric structure possessing a high degree of compositional adhesiveness and cohesiveness for effective usage with the inventive transport stabilizing combination 1 of the present disclosure, while also allowing for a clean cohesive separation from an item 13 (i.e., leaving substantially no visible polymeric residue on the item) upon which the resulting overlay 3 comes into contact.

From a molecular infrastructure standpoint, the unique combination of cross-linking and straight chain reactants and plasticizer types in the amounts prescribed herein creates a uniquely different polymer. The appropriate control of diol and triol reactants appears to create long chain polarized sites ideal for powerful cohesive polar entrapment of the plasticizer while also aligning polarized plasticizer components in a powerful adhesive and cohesive positioning within the polymeric overlay 3. The polarized molecular alignment of the plasticizer cofactor within the polymer infrastructure contributes to a highly cohesive structure which maintains its molecular integrity when subjected to forces tending to cause separation of the viscoelastomeric thermoset overlay 3 from a contacting surface of an item 13. The plasticizer appears to also be a major contributing factor in the overlay's 3 unique viscoelastomeric properties. As a result, the overlay 3 possesses a host of unexpectedly unique and superior properties (e.g., adhesiveness, cohesiveness, releasability, cleansability, antipathogenic, etc.) over conventional adhesive polymers currently available.

As referenced above, the thermosetting diols and triols in cooperative combination with the plasticizer create a polymeric overlay 3 having antipathogenic properties, as well as a thermoset viscoelastic polymeric structure possessing a high degree of compositional adhesiveness and cohesiveness necessary to adhesively secure and retain items 13, in addition to a clean cohesive separation from the items' 13 surfaces. The type of plasticizers and reactants in controlled amounts (within the quantity ranges prescribed herein) can also be effectively utilized to provide desirable thermosetting fabrication conditions for preparing the overlay 3 component, and thereby providing inventive transport stabilizing combinations 1 possessing the unique attributes herein.

As a result of its unique chemical composition and processing conditions, the viscoelastomeric thermoset overlay 3 component of the transport stabilizing combination 1 possesses a host of unique and unexpected properties. For example, the overlay 3 exhibits unique viscoelastic properties. Such viscoelastic properties allow the overlay 3 to at least partially conform to the configuration of an item 13 due to the weight of such item and/or force exerted when a user places the item 13 onto the overlay 3. The result is an increased contacting surface area of the item 13 for better adhesion and adhesive performance.

In addition, the overlay 3 also exhibits unique adhesiveness properties. The overall tackiness, or adhesiveness, of the viscoelastomeric thermoset overlay 3 and its concomitant releasability characteristics can be effectively altered so as to match the needs of a particular item 13 by changing the compositional makeup of the thermosetting reaction media, particularly the diol to triol reaction media weight ratio, as well as the reaction media plasticizer content and the types of plasticizers. For example, an increase in the amount of diol (with respect to the amount of triol) will tend to increase the adhesiveness of the overlay 3, and thus also increase the amount of force required to release an item 13 from the overlay 3. Conversely, an increase in the amount of triol (with respect to the amount of diol) will tend to decrease the adhesiveness of the overlay 3, and thus also decrease the amount of force required to release an item 13 from the overlay 3. In the case where the amount of diol (with respect to the amount of triol) is increased, it has been found herein that a slight increase in the amount of prepolymer will generally serve to balance the reaction media reactants. In general, a transport stabilizing combination 1 having a relatively high degree of adhesiveness will tend to be less effective for releasing relatively small, light and/or fragile items 13, but will tend to be more effective for stabilizing relatively larger, heavier and/or odd shaped items 13.

In addition, the overlay 3 also exhibits unique cohesiveness properties. For example, upon exposure to a counteracting force sufficient overcome the adhesive attraction between an item 13 and the overlay 3 (e.g., pulling an adhesively engaged item 13 away from the overlay 3 to disengage it), the compositional cohesiveness of the overlay 3 will tenaciously retain its viscoelastomeric structural integrity by cohesively releasing substantially cleanly (i.e., without leaving substantially any visible polymeric residue) from the item 13 and then returning to its innate form as prior to engagement of the item 13. This provides a significant advantage with respect to reusability and effectiveness of the overlay, as compared to conventional adhesive compositions (which typically do not return to their same innate form and/or leave visible residue upon a detached item).

In addition, the overlay 3 also exhibits unique releasability properties. More particularly, the overlay 3 possesses a tenacious internal compositional cohesiveness which provides an ability to release substantially cleanly away from an item 13 upon which it comes into contact, substantially without leaving any residue of the polymer remaining on the surface of the item 13. Indeed, upon exposure to a suitable adhesive separating release force (e.g., pulling an adhesively engaged item 13 away from the overlay 3), the compositional cohesiveness of the overlay polymer will tenaciously retain its viscoelastic structural integrity by separating substantially cleanly from the surface of an item 13 upon which it has come into contact (i.e., without leaving more than a trace of polymeric residue upon the surface). Accordingly, upon adhesive separation from such surface, the overlay 3 will return to its substantially intact and innate form as when originally disposed upon the vehicular support member 7 component of the inventive transport stabilizing combination 1, leaving no more than a minuscule amount of overlay polymer residue adhering to the surface of the item 13. More typically, upon separation from the surface of an item 13, there will exist no visible evidence (i.e., by a human eye having 20/20 vision) of overlay polymer residue remaining upon the item's 13 surface. This provides another significant advantage over conventional adhesive compositions (which typically leave a visually detectable amount of residue upon the surface of an item of which it comes into contact).

During the removal of an item 13 from the overlay 3, it has been observed herein that the overlay 3 tends to pull away from the surface of the item 13 until the overlay 3 completely separates (i.e., breaks cleanly away) from the surface, and then the overlay 3 forthrightly cohesively returns to its innate form as when originally applied to the vehicular support member 7 component of the transport stabilizing combination 1. The extent of distortion exhibited by the viscoelastomeric thermoset overlay 3 upon exposure to separation forces from the surface of an item 13 will depend largely upon the adhesiveness, cohesiveness and viscoelastic properties of the overlay 3. It has been further observed herein that, upon coming into contact with a surface of an object 13, overlays 3 herein having relatively higher adhesiveness values will physically tend to tenaciously string-out (similar to the pulling of heated candy taffy) until a clean adhesive, but cohesive, separation ultimately occurs from the surface of the item 13, whereupon the overlay 3 then returns to its original innate form, leaving substantially no residue upon the surface.

In addition, the overlay 3 also exhibits antipathogenic properties. More particularly, the transport stabilizing combination 1 can neutralize pathogens (e.g., viruses, bacteria, germs, etc.) which may be present upon the engaged surfaces of an item 13. This provides another significant advantage over conventional viscoelastomeric polymeric compositions (which typically do not exhibit such antipathogenic properties).

In addition, the overlay 3 also exhibits unique cleansability properties. For example, due to its adhesive nature, the viscoelastomeric thermoset overlay 3 has a tendency to adhesively attract dust, microbes, and other external contaminants (including contaminants from an item 13 and/or a user) which can diminish adhesion over time. However, the original adhesiveness of the overlay 3 can be easily restored via conventional washing and/or other such contaminant removal techniques. For example, unlike conventional adhesive compositions which must be discarded upon contamination (often after merely a single use), the overlays 3 of the present invention may be cleansed from contaminants and restored to their substantially original adhesive, cohesive and antipathogenic efficacy. Surprisingly, conventional washing (e.g., hand-washing, scrubbing, washing machines, dishwashers, etc.) or autoclaving may be effectively utilized to eradicate and remove contaminants therefrom and thereby permit fully functional reuse of the cleansed overlay 3. This provides yet another significant advantage over conventional adhesive compositions (which typically do not exhibit such cleansability capabilities).

Figure 5A:
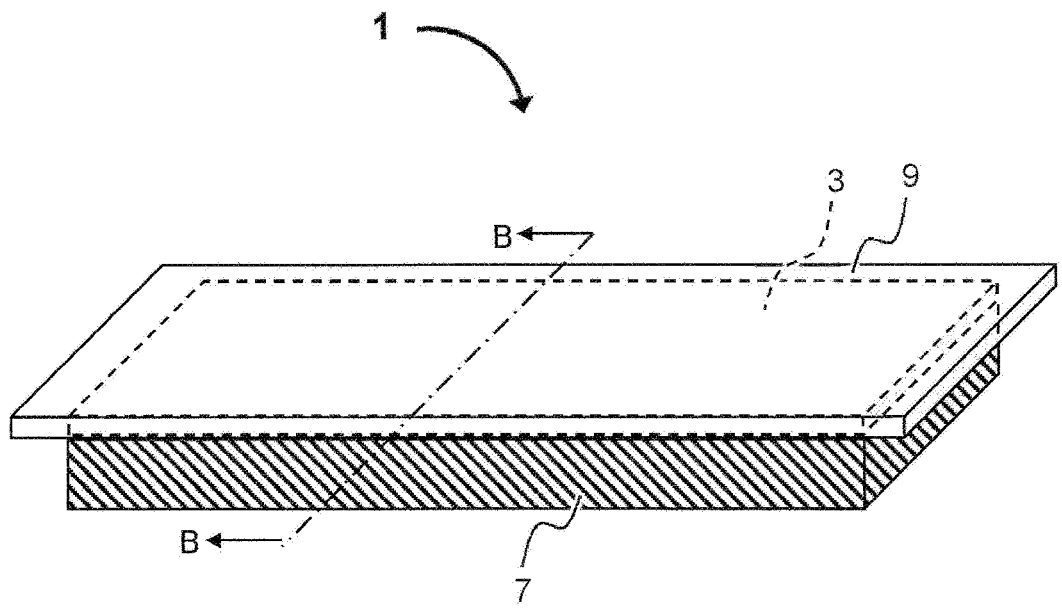
FIG. 5A is a perspective view showing a transport stabilizing combination of the present disclosure comprising a viscoelastomeric thermoset overlay disposed upon a vehicular support member, and further comprising a protective cover disposed upon the overlay.
Figure 5B:
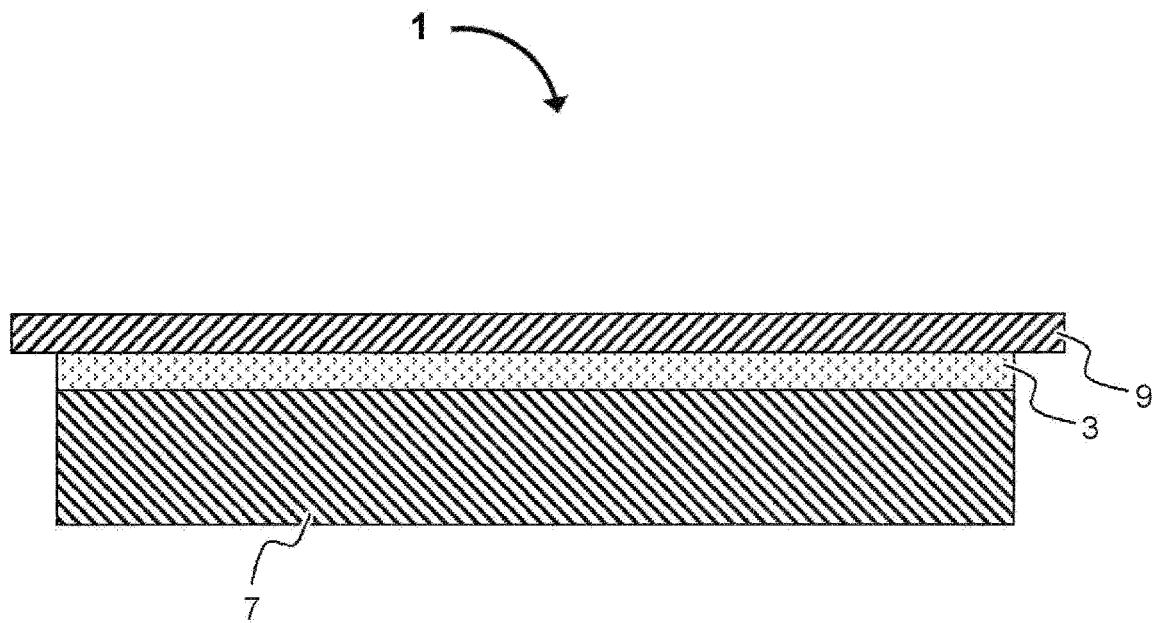
FIG. 5B is cross-sectional view of FIG. 5A taken along line B-B.

Referring now to FIGS. 5A and 5B, as referenced above, it has been discovered herein that certain materials exhibit an attachment force to the viscoelastomeric thermoset overlay 3 herein which may be less than the adhesive force between an item 13 and the overlay 3 (e.g., flat and smooth surfaced PVC materials, Teflon® and paraffin-coated substrates). Such flat and smooth materials can optionally be utilized as a protective cover 9 for the overlay 3 to help prevent contamination or premature adhesion from occurring (e.g., prior to use, or in between uses). Such protective covers 9 can also be useful for protecting the transport stabilizing combination 1 during the distribution process of providing the inventive combination 1 to the user.

In forming the inventive transport stabilizing combination 1 of the present disclosure, the viscoelastomeric thermoset overlay 3 component can be disposed upon a vehicular support member 7 component using various techniques well known to persons having ordinary skill in the art. One such technique includes prefabricating (e.g., via casting, molding, pouring, injecting, film forming, etc.) and subsequent curing of the thermoset reaction media into a layer (e.g., film, pad, sheet, strip, etc.) of the reaction product to pre-form the viscoelastomeric thermoset overlay 3, which can then be adhesively applied to at least one surface of the vehicular support member 7. Another technique includes thermosetting the overlay 3 directly onto the vehicular support member 7, such as by applying (e.g., via casting, pouring, spraying, printing, dipping, coating, etc.) uncured or partially cured thermosetting reaction media onto at least one exposed surface of the vehicular support member 7, and then curing the reaction media in situ to form the viscoelastomeric thermoset overlay 3. It has been observed herein that such in situ curing technique tends to create a stronger attachment force between the overlay 3 and the support member 7 (compared to the prefabricating technique) as the in situ cured overlay 3 not only results in adhesive bonding (similar to an overlay 3 formed by the prefabricating technique), but also appears to result in chemical bonding of the overlay 3 to the support member 7. Although the in situ technique results in a perceptively stronger bond between the overlay 3 and the support member 7, it should be understood that such technique may not be practicable in certain circumstances (such as when the overlay 3 is to be installed by the user rather than by the manufacturer, for example). In any case, it is desirable that the overall attachment force between the viscoelastomeric thermoset overlay 3 and the vehicular support member 7 is greater than the adhesive force between the overlay 3 and an item 13 (i.e., to prevent detachment of the overlay 3 from the support member 7 when an attached item 13 is removed from the overlay 3). In some aspects, with respect to a prefabricated overlay which relies substantially solely on adhesive bonding, such greater adhesiveness to the support member 7 (versus an item 13) can be accomplished by ensuring the surface area of the support member 7 in contact with the overlay 3 is greater than the surface area of the item 13 in contact with the overlay 3. In other aspects, such greater adhesiveness of an overlay 3 to the support member 7 (versus an item 13) can be accomplished by providing anchoring sites (e.g., surface irregularities) upon the surface of the support member 7. Still other techniques as will be apparent to persons having ordinary skill in the art can also be utilized without departing from the scope of the invention.

The thermosetting reaction media for preparing the viscoelastomeric thermoset overlay 3 may accordingly be characteristically formulated so as to possess desired film forming, coating, molding, casting, etc. properties at an appropriate viscosity level during the initial formative thermosetting stages of the thermosetting reaction. For example, the onset viscosity of the reaction media may be suitably formulated so as to provide sufficient fluidity to allow for the prefabrication of coatings, films, castings, moldings or other preforming processes as typically conducted under conventional thermosetting techniques. Thus, conventional calendaring, casting, molding, injecting, coating, film-forming, etc. thermosetting techniques may be effectively utilized at a workable viscosity to prepare the overlay 3 in a sheet or film form, for example. Alternatively, when applying the reaction media to a suitable support member 7 when utilizing the in situ curing technique, procedurally a measured amount of the fluid thermosetting reaction media may be deposited or casted upon a suitable support member 7 and optionally allowed to spread evenly (due to a particular viscosity) and thereafter cured in situ to provide the desired viscoelastomeric thermoset overlay 3. Desirably, upon curing, the resulting overlay 3 will then tenaciously bond to the support member 7. By adjusting the plasticizer content and type, the thermosetting attributes of the reaction media (including the ultimate thermoset tack), as well as the onset reaction media thermosetting viscosity characteristics, may be altered. Accordingly, the thermosetting reaction media viscosity may be effectively altered so as to suit a particular type of manufacture for the transport stabilizing combination 1. Particularly useful viscosity levels for providing an effective preforming reaction media may suitably involve formulating the reaction media with an effective amount of viscosity reducing ester plasticizer (e.g., diester plasticizer, such as dialkyl esters of dicarboxylic acids) which generally imparts sufficient onset fluidity reduction to provide a thermosetting reaction media which may be easily poured, molded, casted, etc. in a desired form during its initial thermosetting stages.

In general, the inventive viscoelastomeric thermoset overlay 3 may be appropriately sized to accommodate a particular transport stabilizing combination 1 and/or its stabilized item(s) 13. For example, the overlay 3 may have any desired shape (e.g., rectangular, square, trapezoidal, triangular, circular, oval, random, etc.), and will typically have a similar shape to the vehicular support member 7, though it need not be (see e.g., FIG. 1). Likewise, the dimensions of the overlay 3 will typically be equal to or less than the dimensions of the support member 7. However, an overlay 3 can also be greater than the support member 7 in one or more dimensions without departing from the scope of the invention. In addition, the transport stabilizing combination 1 can comprise a single overlay 3 or multiple overlays 3 disposed upon a vehicular support member 7 without departing from the scope of the invention (see e.g., FIG. 1).

The viscoelastomeric thermoset overlay 3 will also have a thickness, which may be uniform or non-uniform. There is no particular limit to the thickness, provided that the overlay 3 performs as desired by the user. Due to its exceptional cohesiveness, relatively thin overlays 3 may be utilized for the invention. For example, where the overlay has been produced using the prefabricating technique referenced above, the overlay 3 thickness can typically range from about 1 mm to about 25 mm, such as about 2 mm to about 15 mm. Where the overlay has been produced using the in situ curing technique referenced above, the overlay 3 thickness can be comparatively less, typically ranging from about 0.3 mm to about 20 mm, such as about 0.5 mm to about 10 mm. It should be understood that thicker overlays 3 (i.e., thickness greater than 25 mm and 20 mm, respectively) can also be utilized without departing from the scope of the invention, such as for applications involving the stabilization of relatively very large items and/or very heavy items and/or items having non-flat surfaces, for example, but are typically generally unnecessary.

Referring again to FIGS. 1-6, the viscoelastomeric thermoset overlay 3 provides an ideal environment for an adhesive engagement, and a cohesive release, of items 13 interfacing onto the overlay 3. Due to its viscoelastomeric attributes, the overlay 3 tends to cradle each item 13 placed in adhesive contact therewith, while also allowing its powerful adhesive and cohesive infrastructure to tenaciously restrain each item 13 in an immobilized (i.e., stabilized) position until intentionally removed therefrom by a user. Because of the exceptional chemical and physical attributes of the inventive viscoelastomeric thermoset overlay 3, the stabilization of items 13 against movement of vehicles 5 equipped with the transport stabilizing combination 1 accordingly provides unexpectedly superior efficacy over current dashboard and console pads typically used to frictionally stabilize small electronic devices from sliding displacement (i.e., lateral movement).

By virtue of the viscoelastomeric thermoset overlay 3 component, the transport stabilizing combination 1 comprises sufficient adhesiveness to adhesively engage and restrain a portable item 13 emplaced upon its surface at a stowable position. Due to the unique adhesive efficacy of the viscoelastomeric thermoset overlay 3, the restrained item 13 will essentially remain at its originally restrained position until physically removed therefrom by applying an outwardly pulling force sufficient to overcome the adhesive attraction therebetween. Since the overall attachment force between the overlay 3 and the vehicular support member 7 is desirably greater than the adhesive force between the overlay 3 and the item 13, the overlay 3 will remain in its original attached position to the support member 7, thus keeping the transport stabilizing combination 1 intact upon removal of the item 13, and suitable for re-use.

The present invention advantageously provides a unique combination for stabilizing portable items 13 during conditions of movement. The unique adhesive and cohesive release attributes allow for prolonged and continual adhesive re-use of the transport stabilizing combination 1. Unlike conventional dashboard pads which rely upon tangential frictional contact with an item placed thereupon, the viscoelastomeric properties of the inventive transport stabilizing combination 1 allow for a more effective adhesive cradling and bonding between the viscoelastomeric thermoset overlay 3 and an adhesively adhered item 13. This feature, coupled with a highly adhesive and cohesive molecular infrastructure, and a unique plasticizer loading within its infrastructure, results in a transport stabilizing combination 1 having an unexpectedly advantageous adhesive stabilization of items 13 against movement, as well as a subsequent cohesive release of such items.

Another advantage of the inventive transport stabilizing combination 1 is that it uniquely possesses a tenacious internal compositional cohesiveness, as evidenced by its ability to break cleanly away from its adhesive bonding to an adhered item 13. Characteristically, upon adhesive separation, the viscoelastomeric thermoset overlay 3 component will return to its substantially intact and innate form while leaving substantially no visible polymeric residue adhering upon the separated item 13. The extent of temporary distortion occurring to the transport stabilizing combination 1 during exposure to a separation force will depend largely upon the adhesiveness of the combination 1. Regardless, the ability to return to its substantially intact and innate form, while further also substantially retaining its original adhesiveness, allows for continued re-use of the inventive combination 1, thus providing a significant advantage over conventional transport stabilizing devices or systems which typically cannot be re-used.

Yet another advantage of the inventive transport stabilizing combination 1 is its ability to comprise comparatively high amounts of plasticizer (e.g., greater than about 10 wt % of the overlay 3 weight, such as greater than about 20 wt %, or greater than about 30 wt %) without leakage or bleeding of the plasticizer from the viscoelastomeric thermoset overlay 3 component (as compared to conventional viscoelastomeric polymers). The plasticized cross-linked polymeric structure of the thermoset polymerizate obtained from the thermoset reaction media prescribed herein provides an ideal infrastructure for effectively harboring uncommonly large amounts of plasticizer, and results in unexpectedly superior cohesiveness and adhesiveness, while also contributing highly desired and effective antipathogenic properties. The plasticizer also functions as a contributing factor towards imparting desired viscoelastomeric properties to the transport stabilizing combination 1.

Still another advantage of the inventive transport stabilizing combination 1 is its ability to be cleansed to remove any undesirable contaminants that may adhere thereto, and thus restore any adhesiveness which may have been inhibited as a result thereof. As referenced above, such cleansing can be accomplished with the mere use of water and a soap detergent, such as Dawn® dish detergent, available from the Procter & Gamble Company, having a place of business located in Cincinnati, Ohio, U.S.A. Furthermore, such cleansing will not substantially diminish the additional attributes of the transport stabilizing combination 1 (e.g., viscoelasticity, cohesiveness, antipathogenic, etc.), which allows for continued re-use of the inventive combination 1, thus providing a significant advantage over conventional adhesive compositions and/or transport stabilizing devices or systems (e.g., adhesive tape) which typically cannot be effectively cleansed and cannot be re-used.

It will be appreciated that details of the foregoing disclosure and any examples described therein, given for purposes of illustration, are not to be construed as limiting the scope of the present invention. Although only a few exemplary embodiments of the present invention have been described in detail above, persons having skill in the art will readily appreciate that many modifications are possible without materially departing from the novel teachings and advantages of this invention. For example, features described in relation to one exemplary embodiment may be incorporated into any other exemplary embodiment of the invention.

Accordingly, all such modifications are intended to be included within the scope of the present invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. A transport stabilizing combination for stabilizing an item during conditions of movement comprising:
   A. a vehicular support member having at least one exposed surface, and B. a cohesive and adhesive viscoelastomeric thermoset overlay;
wherein the viscoelastomeric thermoset overlay is disposed upon the at least one exposed surface of the vehicular support member.

2. The transport stabilizing combination of claim 1 further comprising a vehicle.

3. The transport stabilizing combination of claim 1 wherein the viscoelastomeric thermoset overlay is formed from a thermosetting reaction media comprising:
   A. about 1 wt % to about 10 wt % isocyanate prepolymer;
   B. about 35 wt % to about 70 wt % polyols; and
   C. about 20 wt % to about 55 wt % plasticizer;
   wherein the polyols comprise a straight chain linking diol and a crosslinking triol present in a diol to triol weight ratio of about 1:3 to about 3:1; and
   wherein the plasticizer comprises about 20 wt % to about 50 wt % of the total reaction media weight triglyceride plasticizer and 0 wt % to about 40 wt % of the total reaction media weight ester plasticizer.

4. The transport stabilizing combination of claim 3 wherein the isocyanate prepolymer comprises a diisocyanate prepolymer.

5. The transport stabilizing combination of claim 3 wherein the straight chain linking diol comprises a polyether diol and the crosslinking triol comprises a polyether triol.

6. The transport stabilizing combination of claim 5 wherein the polyether diol and the polyether triol each have a molecular weight of about 1,000 to about 10,000.

7. The transport stabilizing combination of claim 3 wherein the triglyceride plasticizer and the ester plasticizer are present in the thermosetting reaction media in a triglyceride plasticizer to ester plasticizer weight ratio of about 1:0 to about 1:1.

8. The transport stabilizing combination of claim 3 wherein the triglyceride plasticizer comprises an epoxidized triglyceride plasticizer.

9. The transport stabilizing combination of claim 8 wherein the epoxidized triglyceride plasticizer comprises an epoxidized vegetable oil.

10. The transport stabilizing combination of claim 9 wherein the epoxidized vegetable oil comprises an epoxidized soybean oil.

11. The transport stabilizing combination of claim 3 wherein the ester plasticizer has a dipole moment of at least 1.5 D.

12. The transport stabilizing combination of claim 3 wherein the ester plasticizer has a molecular weight of less than about 750.

13. The transport stabilizing combination of claim 12 wherein the ester plasticizer is selected from the group consisting of sebacates, adipates, phthalates, isophthalates, maleates, azelates and glutarates.

14. The transport stabilizing combination of claim 13 wherein the ester plasticizer comprises dibutyl sebacate.

15. The transport stabilizing combination of claim 14 wherein the dibutyl sebacate is present in an amount of about 2 wt % to about 20 wt % of the total reaction media weight.

16. The transport stabilizing combination of claim 3 wherein the thermosetting reaction media is reacted in the presence of a catalytic amount of a catalyst.

17. The transport stabilizing combination of claim 16 wherein the catalyst is an organobismuth catalyst.

18. The transport stabilizing combination of claim 3 further comprising a colorant.

19. The transport stabilizing combination of claim 3 further comprising a UV inhibitor.

20. The transport stabilizing combination of claim 1 wherein the viscoelastomeric thermoset overlay has been prefabricated prior to being disposed upon the at least one exposed surface of the vehicular support member.

21. The transport stabilizing combination of claim 20 wherein the viscoelastomeric thermoset overlay has a thickness of about 1 mm to about 25 mm.

22. The transport stabilizing combination of claim 1 wherein the viscoelastomeric thermoset overlay has been cured in situ upon the at least one exposed surface of the vehicular support member.

23. The transport stabilizing combination of claim 22 wherein the viscoelastomeric thermoset overlay has a thickness of about 0.3 mm to about 20 mm.

24. A transport stabilizing combination for adhesively restraining and cohesively releasing a portable item stowed at a stabilized position comprising:
   A. a vehicle;
   B. a vehicular support member disposed upon the vehicle and having a sufficient size and structural integrity to support a portable item; and
   C. a viscoelastomeric thermoset overlay possessing sufficient adhesiveness and cohesiveness to restrain the portable item at a stabilized position and to release the portable item upon application of a force sufficient to overcome an adhesive attraction between the portable item and the viscoelastomeric thermoset overlay while leaving no more than a nominal amount of a polymer residue upon the portable item;
   wherein the viscoelastomeric thermoset overlay is disposed upon at least a portion of the vehicular support member.

25. The transport stabilizing combination of claim 24 wherein the viscoelastomeric thermoset overlay comprises a substantially uniform admixture of:
   A. about 4 wt % to about 8 wt % diisocyanate prepolymer;
   B. about 35 wt % to about 70 wt % polyols; and
   C. about 20 wt % to about 55 wt % plasticizer;
   wherein the polyols comprise polyether diols and polyether triols in a diol to triol weight ratio of about 3:1 to about 1:3; and
   wherein the plasticizer comprises about 20 wt % to about 50 wt % epoxidized triglyceride plasticizer and 0 wt % to about 40 wt % ester plasticizer.

26. The transport stabilizing combination of claim 25 wherein the diisocyanate prepolymer comprises methylene diphenyl diisocyanate.

27. The transport stabilizing combination of claim 25 wherein the epoxidized triglyceride plasticizer comprises an epoxidized vegetable oil plasticizer.

28. The transport stabilizing combination of claim 27 wherein the epoxidized vegetable oil plasticizer comprises epoxidized soybean oil.

29. The transport stabilizing combination of claim 25 wherein the ester plasticizer comprises dibutyl sebacate.

30. The transport stabilizing combination of claim 24 wherein the vehicular support member is flexible.

31. A method for making a transport stabilizing combination for stabilizing a portable item upon a vehicle during conditions of movement comprising:
   A. providing a vehicle comprising a vehicular support member having at least one exposed surface;
   B. providing a thermosetting reaction media comprising:
      1) about 1 wt % to about 10 wt % diisocyanate prepolymer;

2) about 10 wt % to about 40 wt % polyether diol having a molecular weight ranging from about 2,000 to about 6,000;
3) about 10 wt % to about 50 wt % polyether triol having a molecular weight ranging from about 3,000 to about 7,000;
4) about 20 wt % to about 50 wt % epoxidized vegetable oil plasticizer, and
5) 0 wt % to about 40 wt % ester plasticizer having a molecular weight of less than about 750; and C. performing one of the following first or second sequence of steps;

wherein the first sequence of steps comprises:
1) disposing a quantity of the thermosetting reaction media upon the at least one exposed surface of the vehicular support member; and
2) allowing the quantity of the thermosetting reaction media to fully cure to form a viscoelastomeric thermoset overlay, to provide the transport stabilizing combination; and wherein the second sequence of steps comprises:
1) allowing a quantity of the thermosetting reaction media to fully cure to form a viscoelastomeric thermoset overlay; and
2) disposing the viscoelastomeric thermoset overlay upon the at least one exposed surface of the vehicular support member, to provide the transport stabilizing combination.

32. The method of claim 31 wherein the diisocyanate prepolymer comprises methylene diphenyl diisocyanate.

33. The method of claim 31 wherein the epoxidized vegetable oil plasticizer comprises epoxidized soybean oil.

34. The method of claim 31 wherein the ester plasticizer comprises dibutyl sebacate.

* * * * *